(12) United States Patent
Piszko

(10) Patent No.: US 8,442,783 B2
(45) Date of Patent: May 14, 2013

(54) METHOD OF AND APPARATUS FOR RECORDING FUEL SUPPLIED TO A VEHICLE

(76) Inventor: Peter Piszko, Mississauga (CA)

( * ) Notice: Subject to any disclaimer, the term of this patent is extended or adjusted under 35 U.S.C. 154(b) by 510 days.

(21) Appl. No.: 12/542,246

(22) Filed: Aug. 17, 2009

(65) Prior Publication Data

US 2010/0042340 A1    Feb. 18, 2010

Related U.S. Application Data

(60) Provisional application No. 61/089,293, filed on Aug. 15, 2008.

(51) Int. Cl.
*G01F 1/00* (2006.01)
*G01F 15/06* (2006.01)
*G01Q 90/00* (2010.01)
*G06F 19/00* (2011.01)
*G06F 17/40* (2006.01)

(52) U.S. Cl.
USPC .......... 702/55; 73/290 R; 73/290 B; 137/558; 141/95; 222/23; 222/30; 340/450.2; 702/187; 705/307; 708/110; 708/200

(58) Field of Classification Search ............. 73/290 B, 73/290 R, 432.1, 861, 865.8; 222/23, 30; 340/425.5, 438, 450, 450.2, 500, 540, 603, 340/612, 618; 701/1; 702/1, 33, 50, 55, 702/127, 187, 189; 705/1.1, 30, 32, 307, 705/400, 412, 413; 708/100, 105, 110, 131, 708/132, 134, 141, 160, 161, 163, 200; 137/551, 137/558; 141/94, 95, 96
See application file for complete search history.

(56) References Cited

U.S. PATENT DOCUMENTS

| | | | |
|---|---|---|---|
| 4,194,396 A | | 3/1980 | Ohsawa et al. |
| 4,263,945 A | * | 4/1981 | Van Ness ................ 141/98 |
| 4,525,792 A | | 6/1985 | Clinton |
| D288,543 S | | 3/1987 | Zammit |

(Continued)

FOREIGN PATENT DOCUMENTS

| | | |
|---|---|---|
| JP | 2000-28417 A * | 1/2000 |
| WO | 0017610 A1 | 3/2000 |
| WO | 02084231 A1 | 10/2002 |

OTHER PUBLICATIONS

Excerpt of website http://www.howstuffworks.com/, "How Fuel Gauges Work".

*Primary Examiner* — Edward Cosimano
(74) *Attorney, Agent, or Firm* — Bereskin & Parr LLP/S.E.N.C.R.L., s.r.l.

(57) ABSTRACT

A fuel measuring device, for mounting on the inlet to a vehicle fuel tank, has a sensor for recording a flow rate of fuel flowing through the inlet into the vehicle fuel tank. A processor for integrating the fuel flow rate to determine amount of fuel supplied to the fuel tank and a data storage device, for storing data indicative of the volume of fuel supplied to the vehicle fuel tank, are provided. A connector, for enabling the stored data on fuel volume to be transferred from the fuel measuring device on the vehicle to another device separate from the vehicle. A signal from a sender unit of a vehicle fuel tank may be used. A related method enables fuel usage to be tracked by, for example, the renter of a vehicle, and a further related method provides improved fuel gauges for use in fleets of rental cars.

12 Claims, 6 Drawing Sheets

U.S. PATENT DOCUMENTS

| | | | |
|---|---|---|---|
| D310,039 S | 8/1990 | Sumich | |
| 5,072,615 A | 12/1991 | Nawrocki | |
| 5,077,482 A | 12/1991 | Vali et al. | |
| 5,204,819 A * | 4/1993 | Ryan | 705/413 |
| 5,301,550 A | 4/1994 | Shortis | |
| 5,351,725 A * | 10/1994 | Suthergreen et al. | 141/1 |
| 5,377,114 A * | 12/1994 | Gross | 705/413 |
| 5,913,180 A * | 6/1999 | Ryan | 702/45 |
| 6,002,328 A | 12/1999 | Wallrafen | |
| 6,070,156 A * | 5/2000 | Hartsell, Jr. | 705/413 |
| 6,252,499 B1 | 6/2001 | Gerdtz et al. | |
| 6,408,692 B1 | 6/2002 | Glahn | |
| 6,424,924 B1 | 7/2002 | Wagner et al. | |
| 6,568,262 B1 | 5/2003 | Chandebois | |
| 6,898,493 B2 * | 5/2005 | Ehrman et al. | 701/35 |
| 6,993,967 B2 | 2/2006 | Forgue | |
| 7,197,407 B2 * | 3/2007 | Schimnowski et al. | 702/45 |
| 7,287,556 B2 | 10/2007 | Boyle et al. | |
| 8,214,103 B2 * | 7/2012 | Kranz et al. | 701/32.5 |
| 2001/0037298 A1 * | 11/2001 | Ehrman et al. | 705/40 |
| 2002/0186144 A1 | 12/2002 | Meunier | |
| 2004/0204870 A1 * | 10/2004 | Schimnowski et al. | 702/45 |
| 2005/0021422 A1 | 1/2005 | Zimmerman et al. | |
| 2005/0108089 A1 * | 5/2005 | Ehrman et al. | 705/13 |
| 2009/0099724 A1 * | 4/2009 | Kranz et al. | 701/35 |
| 2010/0217630 A1 * | 8/2010 | Ehrman et al. | 705/5 |

* cited by examiner

METHOD OF AND APPARATUS FOR RECORDING FUEL SUPPLIED TO A VEHICLE

CROSS-REFERENCED TO RELATED APPLICATION

This application claims the benefit of expired Provisional Application No. 61/089,293, filed Aug. 15, 2008, which is hereby incorporated herein by reference.

FIELD OF INVENTION

This invention relates to a method of and an apparatus for monitoring fuel level in vehicles.

BACKGROUND OF THE INVENTION

The following paragraphs are not an admission that anything discussed in them is prior art or part of the knowledge of persons skilled in the art.

Vehicles often now include a wide range of features, and increasingly complicated sophisticated electrical and electronic devices. In relation to fuel measurement and monitoring, motor vehicles may include, in addition to a simple fuel gauge, some sort of device or processor for onboard calculation and display of additional data, for example, average fuel consumption, distance that can be driven, either in kilometers or miles, based on a measured amount of fuel remaining in the fuel tank.

Despite these additional features, fuel gauges fundamentally depend upon measurement of fuel level in the fuel tank, and this is often still carried out using relatively simple and imprecise technology. For example, a conventional sender unit in a vehicle fuel tank may consist of a float attached to some sort of rod. This rod is connected to a valuable resistor. The float reflects the fuel level in the tank, and by movement of the rod, the resistance of the variable resistor is varied. The variable resistor is connected in a circuit, including a fuel gauge, so as to give an indication of the fuel level in the tank. Often, this type of sender unit can give quite imprecise feedings at the limits in the fuel tank, i.e. when the fuel tank is nearly full and when it is empty or nearly empty.

For most everyday applications by individual vehicle owners, this is not considered to be a disadvantage. Most drivers and vehicle operators simply need some indication as to the general level of fuel in the fuel tank, so they can make a determination as to when to need fill the vehicle. Indeed, many fuel gauges only give a coarse indication of the fuel remaining in the fuel tank, e.g. many fuel gauges simply indicate fuel tank level by increments of $1/8^{th}$ of the tank volume. Given that the volume of the tank is often some arbitrary multiple of a standard measurement unit, e.g. a liter or gallon, these increments rarely translates into any exact measure of fuel/volume, for example, two gallons or ten liters. Additionally, sender units measure, in effect, the depth of the fuel in the tank. Unless steps are taken to compensate for variations in the shape of a fuel tank (and this is done in more modern systems with microprocessors) then this is another source of inaccuracy Given that customers do not expect or require fuel gauges to be very precise, car companies have developed fuel gauges that give a sufficiently accurate indication of fuel level. Additionally, they have released that it is best, when designing fuel gauges, to err on the side of being conservative. For example, vehicle owners like the satisfaction of seeing a full indication on their fuel gauge and would complain if a gauge never registered a full state; so, many sender units and gauges are set up such that, if the tank is anywhere near full, then a full indication is given. It does not bother an individual owner if, as many owners are aware, a vehicle can be driven for, say, 50 to 100 kms, before there is any noticeable indication that the level in the tank has dropped below full. At the bottom end of the tank, sender units are then usually conservatively designed, so that an empty indication is given, even though there may be a substantial amount of fuel, for example a number of liters, still present.

While this design of fuel gauges and sender units may satisfy individual owners and enable fuel gauges and senders to be manufactured inexpensively, it presents problems for the vehicle rental industry. Rental agreements vehicles commonly provide that a vehicle is provided to a renter with a full tank of fuel. The renter is then required to return the vehicle with the tank full. Many rental agreements provide that the rental company will fill up a fuel tank, but usually at rates that are perceived to include a heavy markup over local fuel costs. There is therefore a significant cost incentive for renters to return a vehicle with a full tank.

The problem arises is that, for many vehicles, the vehicle can be driven for some considerable distance, for example, 50-100 kilometers, before there is any indication that a tank is less than full. Additionally, many renters are businessmen and women, who rent vehicles, e.g. at airport locations, but drive relatively short distances. In North America, it is common for businessmen and women to rent a vehicle in airport simply to drive to a hotel, conference, location, etc. In many cases, the total distance they drive would not be sufficient to cause the fuel tank to register any fuel consumed, and the experienced renters are aware of this fact. This encourages experienced renters to return a vehicle without refilling it, being well aware that they may have used up five, ten or more liters of fuel from the tank. Even if the renter does travel some considerable distance, an experienced renter can again fill up the tank well short of the final destination, the return location for the vehicle, knowing that the fuel used for latter part of the journey will still leave the tank showing a full indication.

All of this means that there are considerable additional costs to the rental industry for having to top up fuel tanks to ensure that vehicles are given to customer with a full tank. If vehicles are not topped up, but simply passed on to the next customer, the tank still registers full, but this can be annoyance for the next customer. If the next customer is honest and diligent, drives only a short distance, and then fills up the tank, they can be surprised at the quantity of fuel required to fill the tank. Again, most people in filling a fuel tank of a vehicle will fill it until a pump at a filling station automatically cuts off; it is impractical to judge the amount of fuel in the tank against the actual fuel gauge while filling the vehicle. This leaves the next customer feeling they have been deceived or defrauded by the rental company.

SUMMARY OF THE INVENTION

The following introduction and summary is intended to introduce the reader to this specification but not to define any invention. One or more inventions may reside in a combination or sub-combination of the apparatus elements or method steps described below or in other parts of this document. The inventor does not waive or disclaim his rights to any invention or inventions disclosed in this specification merely by not describing such other invention or inventions in the claims.

In accordance with a first aspect of the present invention, there is provided a fuel measuring device for mounting on the inlet to a vehicle fuel tank, the fuel measuring device comprising:

- a sensor for recording a flow rate of fuel flowing through the inlet into the vehicle fuel tank;
- a processor for integrating the fuel flow rate to determine amount of fuel supplied to the fuel tank;
- a data storage device, for storing data indicative of the volume of fuel supplied to the vehicle fuel tank;
- and a connector, for enabling the stored data on fuel volume to be transferred from the fuel measuring device on the vehicle to another device separate from the vehicle.

The fuel measuring device may be mounted on a vehicle for use in a rental fleet, and, when the vehicle is to be resold, the fuel measuring device may be removed for reuse.

Another aspect of the present invention provides a fuel measuring device, for connection to a signal from a sender unit of a vehicle fuel tank, the fuel measuring device comprising:

- a processor for determining amounts of fuel supplied to the vehicle from increases in the fuel level in the fuel tank indicated by the signal from the sender unit;
- a data storage device, connected to the processor, for recording data indicative of the fuel amounts supplied to the vehicle;
- and a connector for enabling the stored data to be transferred to another device remote from the vehicle.

The present invention also provides a method of renting a vehicle and recording fuel volume, the method comprising the steps of:

(1) recording a start odometer reading;
(2) completing a rental agreement with a customer;
(3) during a term of the rental agreement, recording fuel supply to the vehicle:
(4) on return of the vehicle at the end of the rental agreement, recording an end odometer reading, and from the start and end odometer readings determining a total distance traveled;
(5) from total distance traveled and an expected fuel consumption rate, calculating an expected total fuel consumption figure for the term of rental agreement;
(6) at the end of the rental agreement, recording total fuel supplied to the vehicle during the term of the agreement;
(7) comparing total fuel supplied to the vehicle with the expected volume of fuel supplied to a vehicle, to determine if adequate fuel has been supplied to the vehicle.

The rental agreement may include the following provisions, (a) the volume of fuel that should be supplied to the vehicle is to be calculated from the distance traveled by the vehicle during the term of the rental agreement and a base fuel consumption rate figure;
(b) if the actual total fuel actually supplied to the vehicle during the term of the agreement is less than the expected volume of fuel that should have been supplied to the vehicle, charging the customer for the difference in the two amounts;
(c) providing that the charge will be calculated as the difference between the two amounts multiplied by a fixed price for the fuel per unit volume.

A further aspect of the present invention provides a fuel measuring device for mounting on the inlet to a vehicle fuel tank, the fuel measuring device comprising a sensor for measuring fuel supplied to the vehicle, a data store for storing the fuel data, and a connector or display for enabling transmission of the data to another device for use externally of the vehicle.

Another aspect of the present invention provides a method of providing vehicles with improved fuel gauges for use in fleets of rental cars, the method comprising the steps of:

(i) requesting vehicle manufacturers to provide vehicles for use in a rental fleet with sender units that are at least accurate over all the upper portion of fuel tank, and devices connected to the sender units for enabling accurate recordal of actual total fuel supplied by renters of the vehicles during terms of rental agreements;
(ii) purchasing sufficient quantities of vehicles from a vehicle manufacturer, to justify the additional costs of providing the improved sender units; and
(iii) utilizing the vehicles in the rental fleet, and utilizing said devices, to ensure that renters of the vehicles cover the cost of fuel used.

BRIEF DESCRIPTION OF THE DRAWINGS

For better understanding of the present invention and to show more clearly how it may be carried into effect, reference will now be made, by way of example, to the accompanying drawings in which.

DESCRIPTION OF THE INVENTION

Various apparatuses or methods will be described below to provide an example of an embodiment of each claimed invention. No embodiment described below limits any claimed invention and any claimed invention may cover apparatuses or methods that are not described below. The claimed inventions are not limited to apparatuses or methods having all of the features of any one apparatus or method described below or to features common to multiple or all of the apparatuses described below. It is possible that an apparatus or method described below is not an embodiment of any claimed invention. The applicants, inventors and owners reserve all rights in any invention disclosed in an apparatus or method described below that is not claimed in this document and do not abandon, disclaim or dedicate to the public any such invention by its disclosure in this document.

Figure 1:
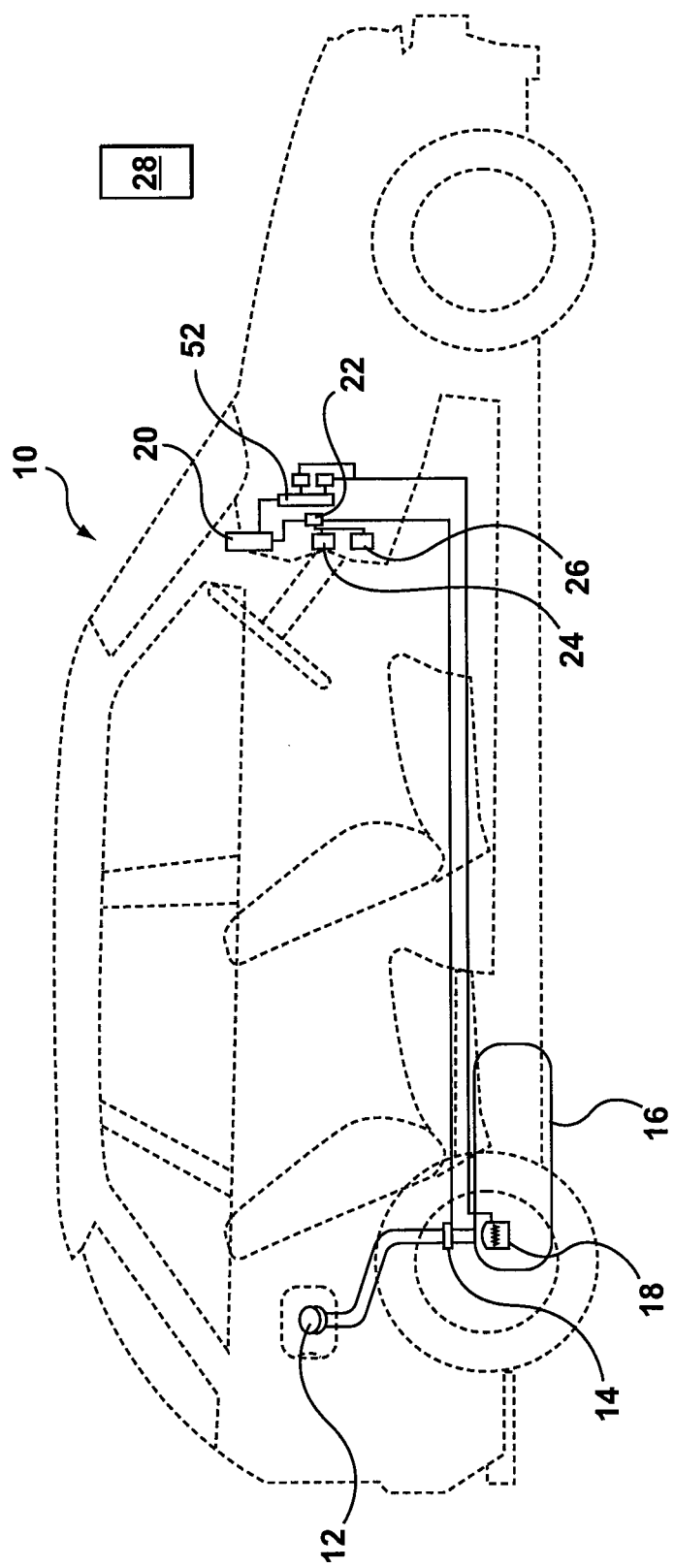
FIG. 1 is a side view of a vehicle showing a fuel measuring device in accordance with the present invention.

Referring first to FIG. 1, there is shown vehicle 10. It will first be understood that the present invention is applicable to any vehicle that might be rented out, but, commonly, is expected to be applied to cars. The vehicle car 10 includes, in a known manner, a fuel or gas inlet 12. Further details are not given here, but, in known manner, the fuel inlet 12 will usually have a screw cap, and an outer closure of flap or cap that can be released from inside the vehicle, and may be lockable.

In accordance with a first aspect of the apparatus of the present invention, around or adjacent the fuel inlet 12, there is provided a fuel measuring device 14. The measuring device 14 is such as to record the quantity of fuel passing through the inlet and to a fuel tank 16. If the volume of fuel in the inlet tube to the tank 16 is considered significant, the measuring device can be located higher up, closed to the actual fuel inlet. The fuel tank 16 includes a sender unit 18, connected to a dashboard gauge 20 (shown in more detail in FIG. 2), in a known manner. The fuel measuring device 14 of the present invention measures and records the total fuel input into the fuel tank 16 in a preset period i.e. during the term of a rental agreement. The fuel measuring device 14 can be reset to zero start of a rental agreement, and a measurement can be taken at the end of the rental agreement, and then the device 14 can be reset to zero again.

For this purpose, fuel measuring device 14 can be connected to an electronic data unit 22 that includes a separate microprocessor and a memory device for recording fuel data. The data unit 22 in turn is connected to at least one of a connection port 24 and a wireless transmitter 26. The connection port 24 can be, for example, a USB port. Then, an operator of a rental vehicle can use a separate data transfer unit indicated schematically at 28 to make a connection to either the connection port 24 or the wireless transmitter 26, to upload data to the data transfer unit 28 from the memory device of the electronic data unit 22.

It will be understood that the various components 22, 24 and 26 are shown schematically, as is the data transfer unit 28. The components 22, 24 and 26 may be integrated into two components or just one component, and may be located elsewhere on the vehicle. For example, they could be located integral with or adjacent the fuel measuring device 14, so no components would need to be installed in the dashboard of the vehicle. This can also facilitate removal and reuse of the fuel measuring device 14. Many rental companies hold new vehicles for relatively short periods of time, and it will be more cost effective to have fuel measuring devices that can be reused, rather than having to buy a new unit for each vehicle. As required, various components, including the fuel measuring device 14, and associated components 22, 24 and 26 can be connected the vehicle electrical system.

Rental companies often provide employees who handle incoming returned vehicles with hand held data recording units, for recording details returned vehicles including such information as distance driven, time returned, etc. These units can be integrated with the data transfer unit 28 indicated here.

While a fuel measuring device 14 and associated elements of the present invention can provide the necessary information for a rental company, for many applications it may be desirable to provide this information to the renter of the vehicle. As detailed below, the method aspect of the invention may include advising a renter at the time the vehicle is taken, that he or she has an obligation to return the vehicle having refilled the tank with sufficient fuel to cover that used and that the renter will be charged for any discrepancy. To reinforce this and as a reminder, it should be useful for a dashboard display to provide appropriate information to the renter.

Figure 2:
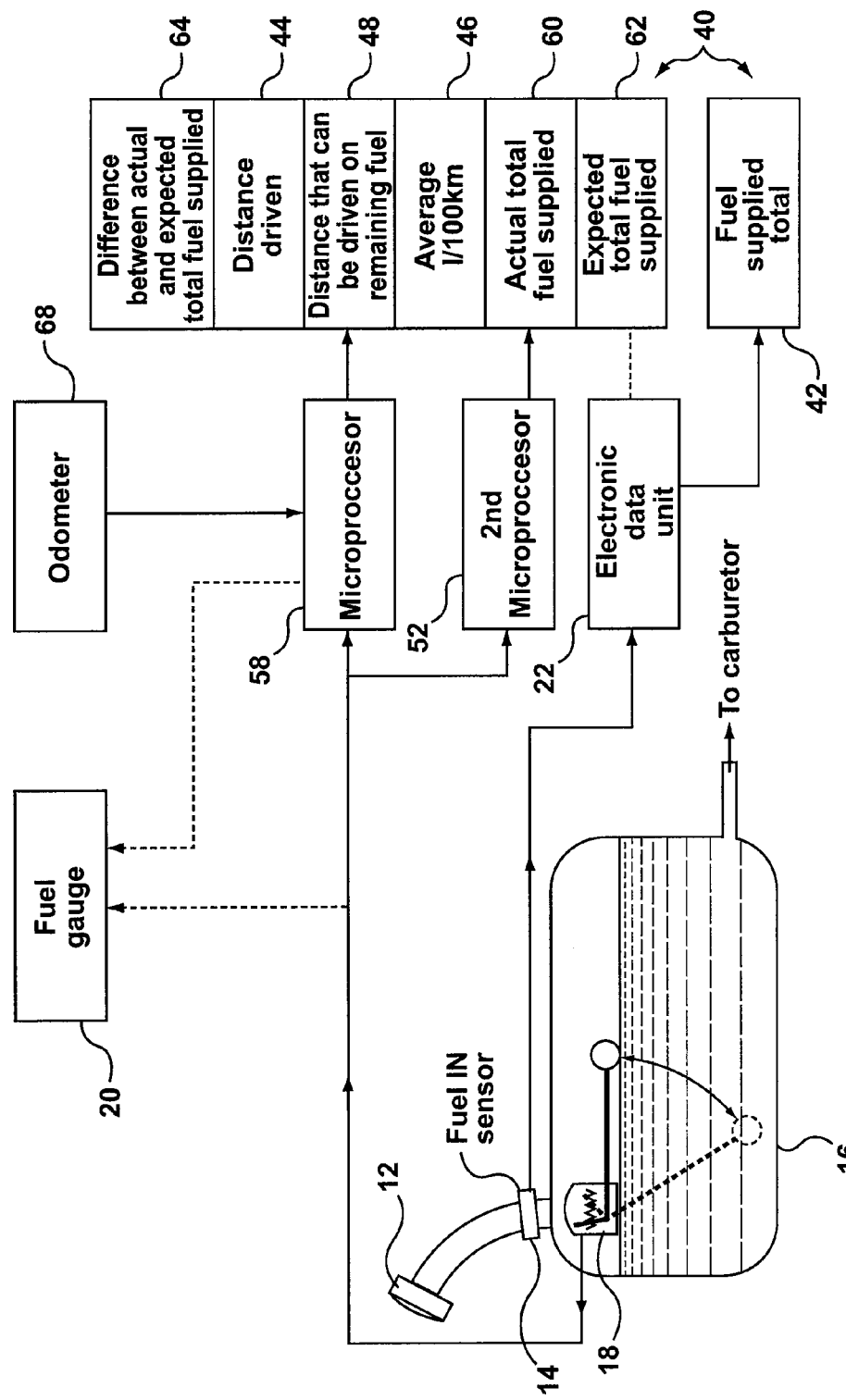
FIG. 2 is a schematic view of a fuel tank, including the fuel measuring device of the present invention and a dashboard display.

For this purpose, as shown in FIG. 2, a dashboard display 40 can be provided. This enables a renter to see that the measurement of the actual total fuel supplied during the term of the rental contract, and to keep track of the fuel consumed. As detailed below, it can further enable a renter to moderate driving habits, to give optimum fuel consumption. Such a display is indicated at 42.

In known manner, the sender unit 18 can be connected directly to a fuel gauge 20, or as in many vehicles, the sender unit can be processed in a microprocessor 58 and then passed to the fuel gauge 20.

Thus, the display 42 will usually start with a zero display, and each time the renter adds fuel to vehicle, the electronic data unit will record this fuel and add it to the running total displayed. Having the display present enables the renter to check the reading against a reading on a pump at a gas station.

Additionally, the dashboard display 40 can display total distance driven during the relevant period and average fuel consumption rate. While many vehicles will currently provide this information based on a resetable trip meter, renters may find it desirable to additionally have this information that corresponds exactly to the data that will be used by the rental company; for this purpose, the present invention may provide that the trip meter is under the control of the rental company, and not the actual renter or operator of the vehicle. Such conventional displays are indicated at 44 for the distance driven and 46 for the average fuel consumption rate. In known manner, the average fuel consumption rate can be indicated either as miles or gallon or liters used per 100 kilometers, and distance driven can be indicated in any suitable units, usually miles or kilometers. There may additionally be a display 48, indicating distance that can be driven on remaining fuel, which may be determined from a calculation of the volume of fuel in the fuel tank 16 and the average fuel consumption rate indicated at 46.

The dashboard display 40 may be connected to the fuel measuring device 14, to receive the data on the actual total fuel supplied to the vehicle during the relevant period. For this purpose, FIG. 2 shows a dashed connection from the electronic data unit 22 to the dashboard display 40. It could receive distance driven information from a vehicle odometer 68, and from these two pieces of data can provide the average fuel consumption rate; as detailed below the fuel consumption rate can also be provided using existing devices that rely on a signal from the sender unit 18, for the fuel data.

Another aspect of the present invention envisages that, instead of a special fuel measuring device 14, the fuel tank 16, can instead be provided with a sender unit 18 that has a sufficiently high level of accuracy, to enable accurate data to be obtained on fuel level on the tank, such that it may be used as the sole data source, for fuel data. For this purpose, the sender unit 18 needs to provide an accurate measure of the fuel level, at least at the top part of the tank all the way up to a completely full condition. It may also be necessary or desirable for its signal to be processed to compensate for non-linearities caused by the shape of the fuel tank 16. It is expected that it will not be necessary to have an accurate measure of the tank level towards the bottom of the tank, since few renters will run the fuel tank so low as to risk running out of fuel, although this may be preferable.

For the purpose of use by a rental company, this dashboard display 40 can include, similar to the fuel measuring device 14, an electronic data unit or microprocessor 52, and at least one of a connection port 24 and wireless transmitter 26. The electronic data unit 52 may be integral with, or separate from, an existing microprocessor or electronic component, indicated at 58, for processing fuel information, which as shown would be connected to the odometer 68 for receiving distance data.

Again, the connection port 24 and wireless transmitter 26 enable data to be uploaded by a rental company employee checking in a returned vehicle. This can be done using the data transfer unit 28.

As indicated in FIG. 2, data from the electronic data unit or microprocessor 52 and from the microprocessor 58 can be used to provide a variety of displays. In addition to the displays 44, 46 and 48, there can be provided a display of actual total fuel supplied 60 (i.e. the accumulated total of all the fuel actually supplied to the vehicle during the term of the agreement); this is shown separately from the display 42, although it is the same information, as it is calculated from data from the sender unit 18. It may also include a display 62 of expected total fuel supplied, calculated from the distance driven and the average fuel consumption rate 46. There may also be a display 64 of the difference between the actual and expected total fuel supplied, to indicate the amount of fuel that a renter needs to supply to the vehicle. When a renter returns a vehicle with the same amount of fuel as it had originally, usually a full tank, then this indication 64 should be zero.

It is also to be understood that, in known manner, the various displays 44, 46, 48, 60, 62 and 64 need not all be provided separately, but could be in the form of a display that only shows at any one time one or more of the items of information, and has a facility to enable a user to cycle through the displays.

Many rental vehicles are bought new by rental companies, and kept for a relatively short period of time, e.g. 3 to 6 months, and then resold to the public. For users of rental vehicle, the dashboard display 40 and associated components can effectively be locked, either mechanically or electrically, so that the data can only be reset by an authorized person, e.g. a rental company. The display unit 40 can further include a facility that it can be unlocked, and can then function as a somewhat conventional trip meter, i.e. so as to be resetable by any user of the vehicle. Then, when a vehicle is disposed of or sold by a rental company, this display unit 40 can be unlocked, to provide these functions to the end purchaser of the vehicle.

Figure 3:
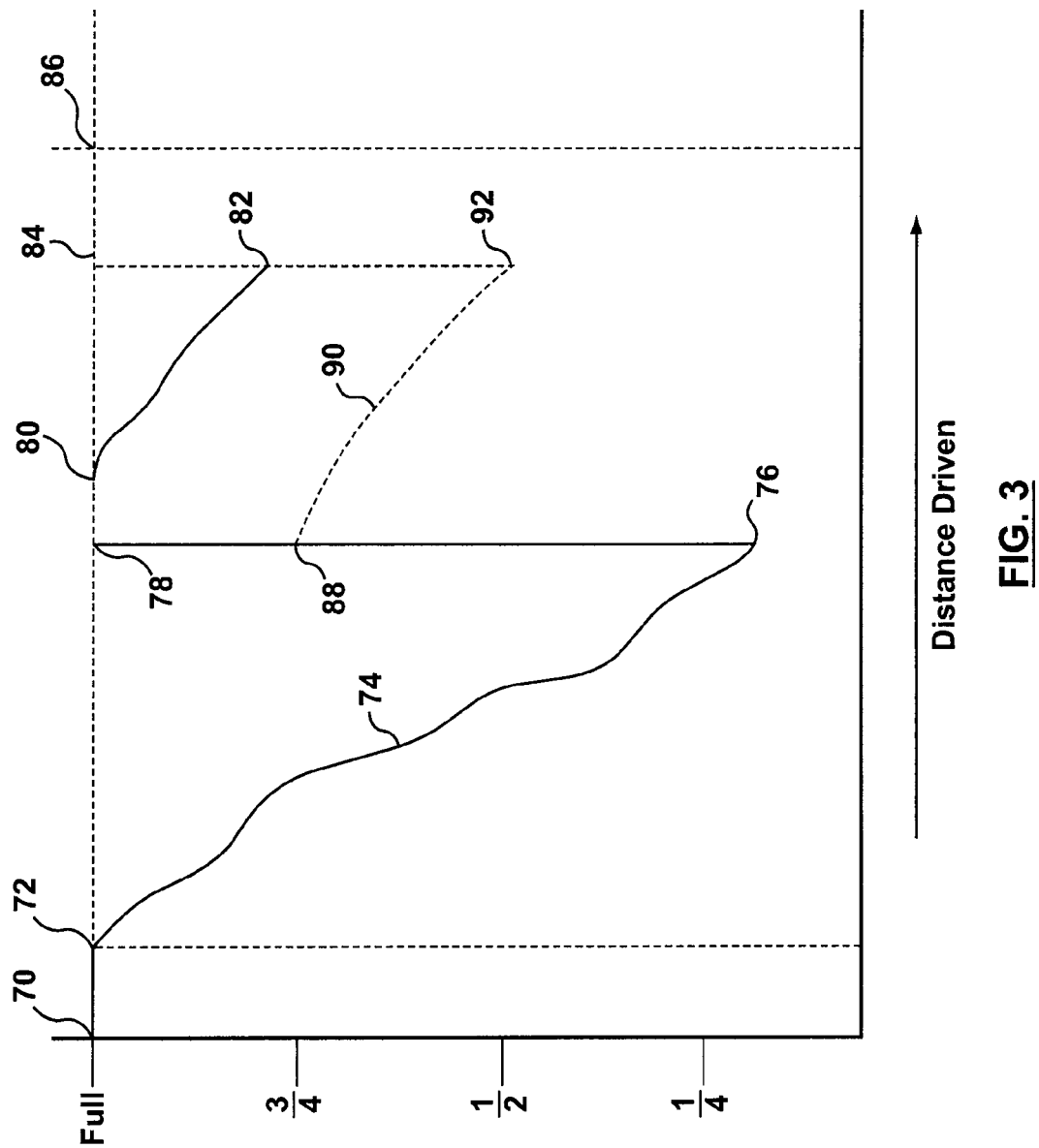
FIGS. 3 and 4 are graphs showing a relationship between fuel level in a fuel tank and distance driven.

Referring to FIG. 3, there is shown a graph of typical variation in fuel level characteristics for vehicle, when the vehicle starts with a full tank of fuel. The vertical axis indicates the fuel level displayed by a conventional fuel gauge, while the horizontal axis indicates distance driven. The vertical axis shows indications typical of those provided by a conventional fuel gauge. As detailed, the actual fuel level will be different due to various inaccuracies.

At 70, a renter picks up a rental vehicle with a full tank of fuel, and commences use of the vehicle. While use of the vehicle necessarily consumes fuel, during the first distance driven, the fuel gauge will continue to register a full indication.

For many vehicles, it is possible to drive 50-100 kms, for example, with a fuel gauge still registering a full condition. The maximum distance it can be driven before the fuel gauge starts to drop as indicated as 72. Knowledgeable renters or customers will take advantage of this to return a vehicle with an apparently full tank of fuel, even though some fuel has been consumed. Following this period, further use of the vehicle continues to use fuel, and the fuel gauge will register this, as indicated by the line 74. In known manner, the rate of fuel consumption corresponds closely to the distance driven, but will vary somewhat depending upon the type of driving, e.g. city driving usually consumes fuel at the higher rate, as compared to maintaining a steady speed on a highway. This is shown by the varying slope of the line 74.

At 76, the level in the fuel tank, here indicated for example as somewhat less than a quarter of a tank, is low enough for the renter to decide to refill the tank. If the tank is refilled to a full level indicated as 78, then again when a renter starts driving, the initial further driving period indicated to the point 80 occurs with no indication by the fuel gauge of fuel consumed. Further fuel consumption causes the fuel level to drop to level indicated at 82.

It is assumed that the renter will be returning the vehicle, and refills it to a level indicated at 84 prior to returning the vehicle to the rental company. When a renter wishes to take advantage of inaccuracies in fuel gauge readings, he or she can refill the vehicle some distance away from the final drop off location, confident that additional fuel consumed will not register on the fuel gauge. Thus, the renter can keep driving until the point indicated that at 86, and return the vehicle with it showing a full tank, even though some fuel has been consumed.

As indicated at 88 when initially refilling the vehicle, the renter may choose to only partially refill it and in this case, the vehicle and its fuel gauge are then operating within what can be approximately categorized as the linear zone of the fuel gauge, i.e. a fuel gauge will immediately show any consumption of the fuel, as indicated by the line 90 until the fuel level has dropped to that indicated at 92. At this point if the renter refills it to the full condition indicated 84, there is again the option of driving the vehicle for period of time, serving to consume fuel, without this being indicated on the fuel gauge, provided the distance does not exceed that indicated by 86.

Conventionally, upon return of a vehicle to a rental company, an operator or rental company employee simply checks the fuel gauge to determine that the tank is full, but as noted this can give erroneous indication. In accordance with the present invention, the actual quantity of fuel supplied during the term of the agreement is recorded. In accordance with standard terms of a rental agreement, the distance driven is that between the point 70 and 84 in FIG. 3, or 70 and 86 if the renter drives that additional distance.

In accordance with the present invention, the fuel added at points 76 and 92 is recorded and compared with the distance driven. It may be necessary to ensure that software and hardware associated with the microprocessor 58 only records fuel input into the vehicle and not accidental oscillation and variations in fuel level. For example, the microprocessor 52 will often be set up to smooth out any short term variations in fuel level caused by vehicle motion, and in some vehicles significant gradients can distort fuel readings and give the impression that fuel level has increased, that could be read as fuel added to the vehicle. This could be achieved by providing that a reading of fuel input into the vehicle is only taken when there is one or more of: the vehicle is stationary, which would require a motion sensor; the engine is turned off, as common practice requires this when refueling. An average, expected fuel consumption rate for the vehicle is used to determine the expected fuel consumption, from the recorded distance driven. If the fuel added to the vehicle is less than that expected under this calculation, then the renter is charged for the difference?

Figure 4:
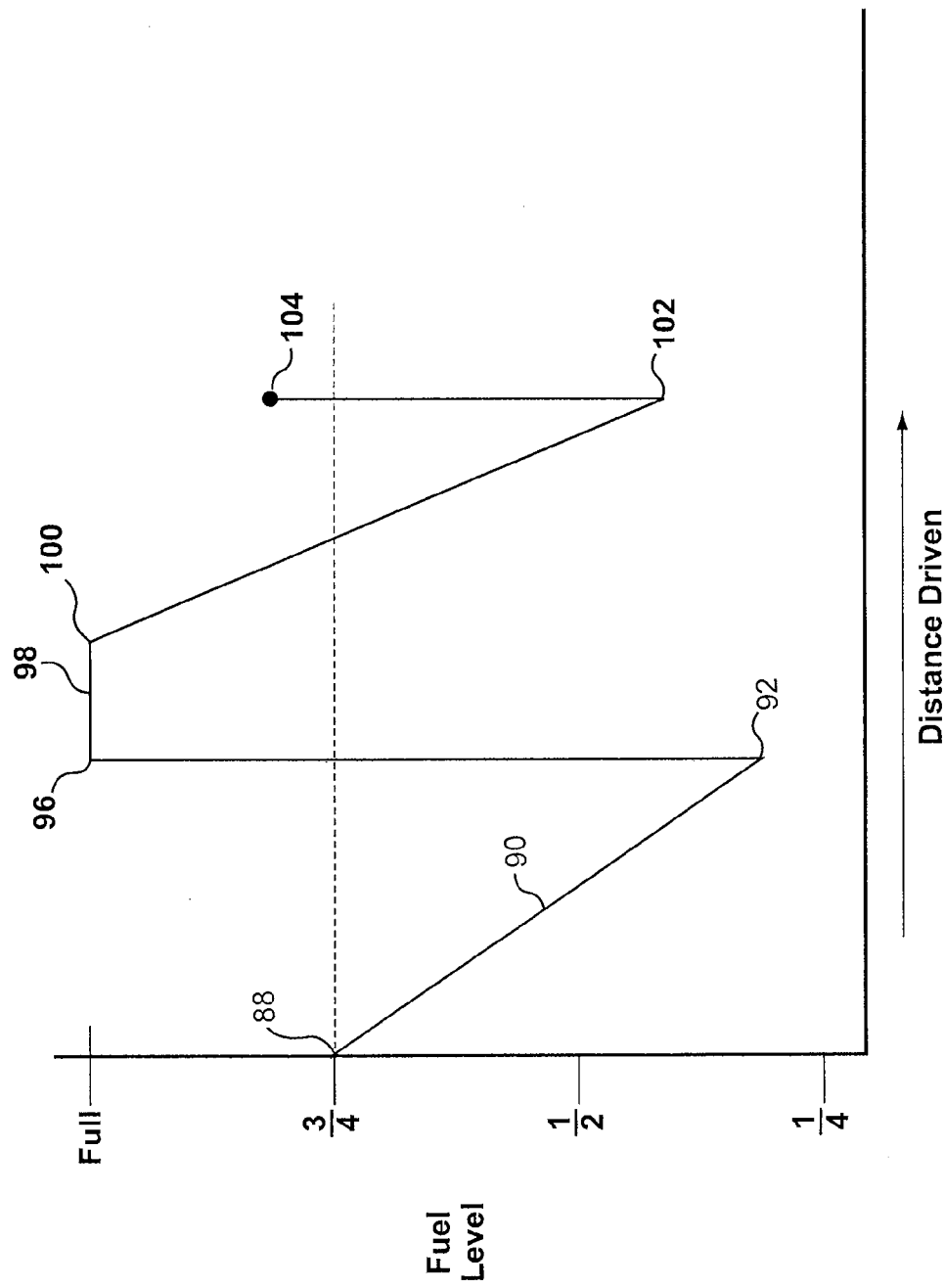

Reference will now be made to FIG. 4, which shows an alternative arrangement, to emphasis that the present invention need not rely upon any indication provided by a conventional fuel gauge.

Here, a vehicle commences with the tank indicating that it is approximately ¾ full (again the actual fuel level in the tank may not correspond exactly to the indication provided by the gauge). This indication is provided at 88.

The fuel gauge is operating in its approximate linear range, so that the use of the vehicle usually causes the fuel level indication to drop immediately, as indicated by line 90 until a level is reached at 92. Here, the renter chooses to refill the vehicle to a full level indicated at 96. As for the earlier figure, the method of present invention works equally well if the renter chooses to only partially refill the tank.

Further use of the vehicle then first encounters the portion indicated 98 where fuel is consumed, distance is covered by the vehicle, but no indication is provided by the fuel gauge of fuel consumed, until point 100 is reached.

Further use results in the fuel gauge then operating approximately linearly, again varying somewhat depending upon the type of driving. The fuel consumed and distance covered are then indicated by point 102.

At point 102, the renter or operator of the vehicle refills the vehicle to level indicated at 104 which is slightly above the start level indicated 90, i.e. slightly, more ¾ of a tank.

Upon return of the vehicle, an operator for the rental company would check the total fuel supplied. The total fuel supplied is recorded data for the fuel supplied at data points 92 and 102. Using an unexpected rate of fuel consumption, the expected total fuel consumed will be calculated. In the present case, since the renter has returned the vehicle with more fuel than it originally contained, the actual total fuel supplied to the vehicle should comfortably exceed the calculation of expected total fuel consumption It will thus be seen that the method of the present invention does not necessarily require the vehicle to be supplied with a full tank of fuel. However, in most cases this is usually preferred. It is expected by renters. It provides some level of convenience, as renters need only refill a vehicle to a full condition close to a return or drop off, to ensure the fuel supply to the vehicle does meet the requirements of the rental agreement. If the vehicle is supplied with, as in this example, ¾ of a tank, it is difficult for the renter to judge refilling the vehicle to an exact ¾ or tank condition.

Figure 5:
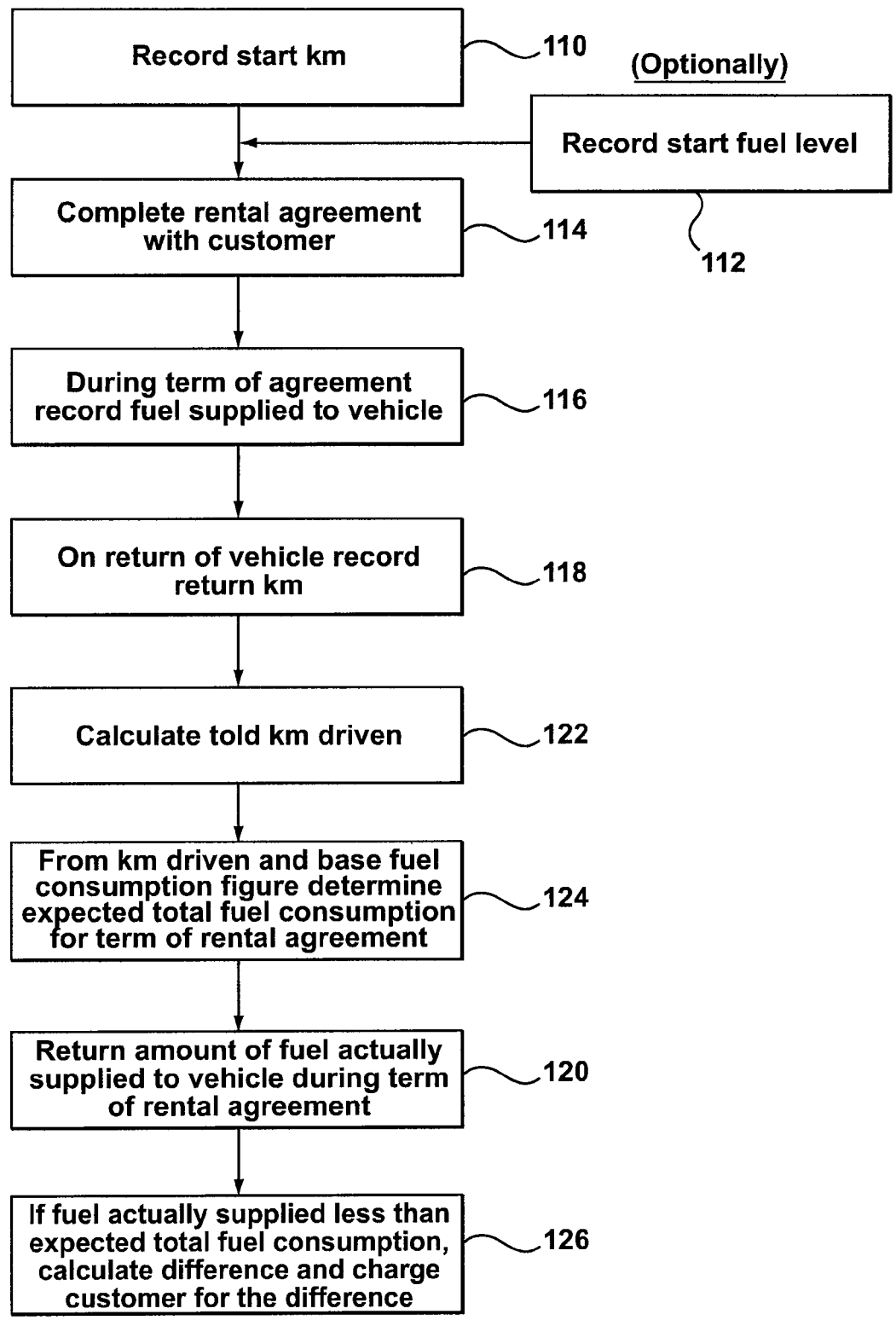
FIG. 5 is a flow chart showing steps in one aspect of a method according to the present invention.

Referring to FIG. 5, there is shown a flow chart of a method, in accordance with one aspect of the present invention. This method relies upon just recording the fuel supplied during the term of a rental agreement and the total distance driven, measured in, for example, miles of kilometers. As is standard the total kilometers or miles driven may be determined from recording start and end kilometer readings from the vehicle odometer.

At step 110, a start kilometer reading is taken from the vehicle odometer, and the fuel level in the vehicle may optionally be recorded at 112. Conventionally, this is done by simply reading the vehicle fuel gauge, but as noted this reading can be erroneous.

At step 114, a rental agreement is completed with a customer. This would include a provision for:

(i) calculating expected total fuel consumption from a base fuel consumption rate figure and kilometers driven, (ii) recording actual total fuel supplied to the vehicle during the term of the agreement;

(iii) charging the customer for any difference, if the actual total fuel supplied is less than the calculated or expected total fuel supplied.

At step 116, during the term of the agreement, recording fuel supplied to the vehicle. As above, this can be done by various means, including, providing a fuel measuring device 14, for recording fuel as it is supplied to the fuel tank; providing a device or unit connected to the conventional sender 18 in the fuel tank 16, as in FIG. 2, to determine and to record amounts of fuel added to the vehicle.

When the vehicle is returned, at step 118, the kilometer reading from the odometer is recorded. Additionally, the actual total fuel supplied during the term of the agreement is recorded at step 120. This can be either by making a wired or wireless connection to one of the devices 24, 26 in FIG. 1.

In step 122, the total kilometers or miles driven is calculated. At step 124, from the distance driven and a basic fuel consumption rate figure, a determination is made of the expected total fuel consumption during the term of the rental agreement.

In step 126, the amount of fuel actually supplied and recorded in step 120 is compared with the expected total fuel consumption during the term of the agreement. If the actual total fuel supplied to the vehicle is less than that expected to be supplied, the customer is charged for the difference, at the preset rate (e.g. set in local currency per liter or per gallon).

Figure 6:
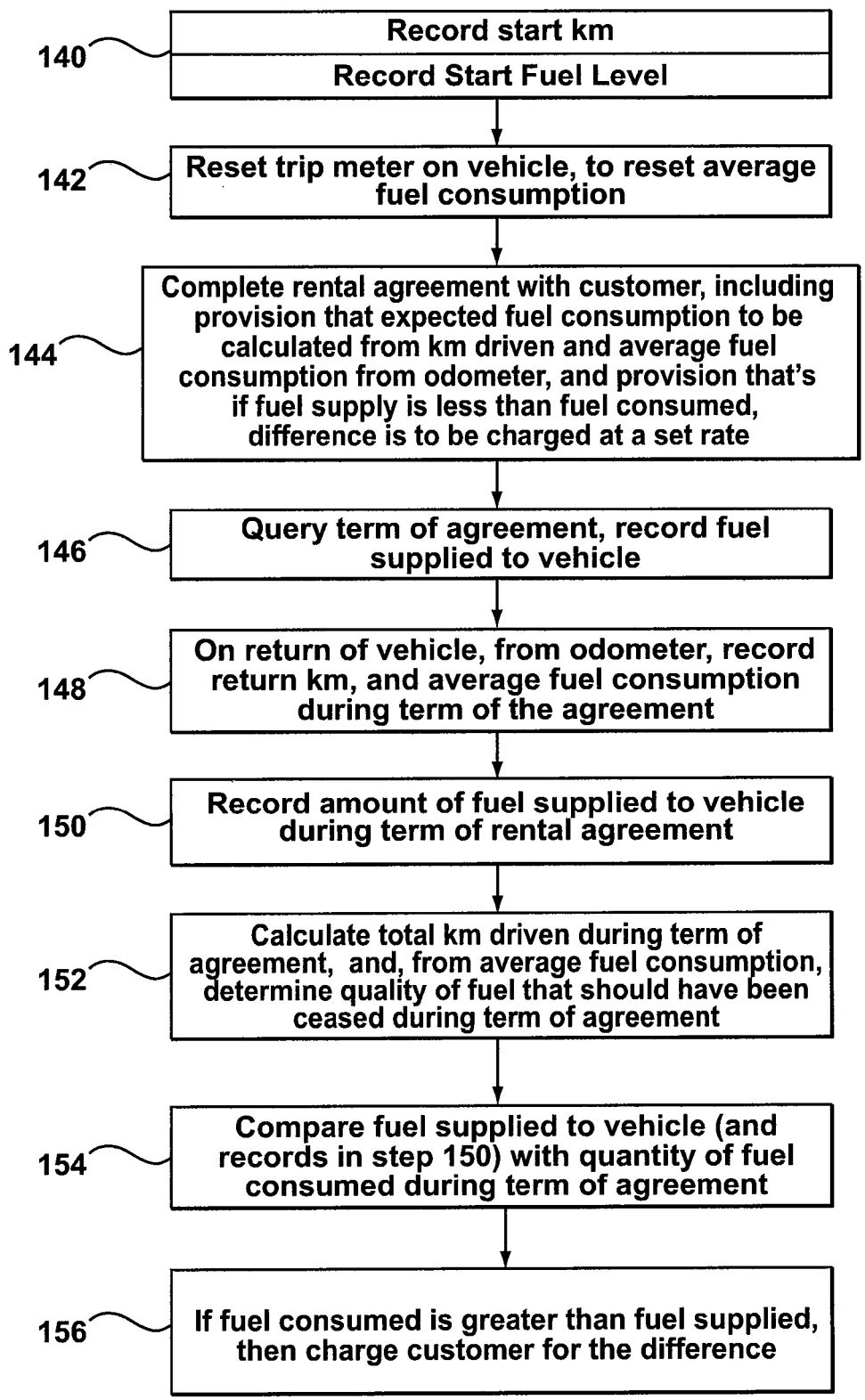
FIG. 6 is a second flow chart showing steps in accordance with another aspect of the method of the present invention.

Referring to FIG. 6, there is shown an alternative method in accordance with the present invention. This method relies upon using existing recording and measuring devices in the vehicle. More specifically, rather than applying an arbitrary figure for expected fuel consumption rate, this method utilizes the vehicles own calculation of fuel consumption rate to determine the expected amount of fuel that should have been supplied to the vehicle.

At step 140, again, the start kilometer or mileage reading is recorded, and as in FIG. 5, optionally the start fuel level can be recorded.

In step 142, a trip meter on a vehicle is reset to reset an average fuel consumption rate. At step 144, a rental agreement is completed by the customer. This agreement would include the following provisions:

(a) the expected fuel of consumption rate is to determined from the figure taken from the vehicle trip meter;

(b) total distance driven in kilometers or miles, will be taken from readings of the odometer at the start and end of the term of the rental agreement;

(c) fuel supplied to the vehicle will be recorded during the rental agreement, and a figure for the actual total fuel supplied to the vehicle will be used to determine if sufficient fuel has been supplied to the vehicle, independently of any reading from the fuel gauge;

(d) if the actual total amount of fuel supplied to the vehicle during the terminal agreement is less than the calculated or expected total amount of fuel supplied to the vehicle, then the customer will be charged for the difference at a preset rate (expressed as local cost per liter, gallon or other unit volume)

Then, during the term of the agreement, at step 146, the fuel supplied to the vehicle is recorded and stored as data on a vehicle. This can be done using the devices of FIGS. 1 and 2.

On return of the vehicle, in step 148, the odometer is read to record a return kilometer/mileage reading. Additionally, the average fuel consumption during the term of the agreement is taken from the vehicle trip meter.

At step 150, data from the vehicle for the total amount of fuel supplied to vehicle during the term of agreement is read and recorded.

Then, at step 152, from the total kilometers/miles driven during the term of the agreement and the average fuel consumption rate, a determination is made of the quantity of fuel should have been supplied to the vehicle during the time of the agreement.

At step 154, this is then compared to the recorded amount of total fuel actually supplied to the vehicle during the term of the agreement.

If the fuel actually supplied to the vehicle is less than the calculated amount of fuel that should have been supplied to the vehicle, at step 156, the customer is then charged to the difference, at the preset rate.

The invention claimed is:

1. In combination a vehicle including a vehicle fuel tank having an inlet and a fuel measuring device mounted on the inlet to the vehicle fuel tank, the fuel measuring device comprising:

a sensor for recording a flow rate of fuel flowing through the inlet into the vehicle fuel tank;

a processor for integrating the fuel flow rate to determine amount of fuel supplied to the fuel tank;

a data storage device, for storing data indicative of the volume of fuel supplied to the vehicle fuel tank;

and a connector, for enabling the stored data on fuel volume to be transferred from the fuel measuring device on the vehicle to another device separate from the vehicle.

2. The combination as claimed in claim 1, wherein the connector provides at least one of a wired connection and wireless connection.

3. The combination as claimed in claim 1, that is removable, whereby, in use, the fuel measuring device may be mounted on a vehicle for use in a rental fleet, and, when the vehicle is to be resold, the fuel measuring device may be removed for reuse.

4. The combination as claimed in claim 1, wherein the connector includes an input enabling the fuel measuring device to be reset, whereby the recorded volume of fuel supplied to the vehicle can be reset to zero.

5. The combination as claimed in claim 1, including a connector, for connection to the vehicle electrical supply.

6. In combination a fuel measuring device and a vehicle, the fuel measuring device being mounted on the vehicle and being connected to a signal from a sender unit of a vehicle fuel tank, the fuel measuring device comprising:
- a processor for determining amounts of fuel supplied to the vehicle from increases in the fuel level in the fuel tank indicated by the signal from the sender unit;
- a data storage device, connected to the processor, for recording data indicative of the fuel amounts supplied to the vehicle;
- and a connector for enabling the stored data to be transferred to another device remote from the vehicle.

7. The combination as claimed in claim 6, wherein the connector provides at least one of wired and a wireless connection.

8. The combination as claimed in claim 6, wherein the processor includes a connection to a dashboard microprocessor for receiving a signal indicative of average fuel consumption rate from the dashboard microprocessor and storing the fuel consumption data in the data storage unit, for later transfer to a device remote from the vehicle.

9. A method of renting a vehicle and recording fuel volume, the method comprising the steps of:
(1) recording a start odometer reading;
(2) completing a rental agreement with a customer;
(3) during a term of the rental agreement, recording fuel supplied to the vehicle;
(4) on return of the vehicle at the end of the rental agreement, recording an end odometer reading, and from the start and end odometer readings determining a total distance traveled;
(5) from total distance travelled and an expected fuel consumption rate, calculating an expected total fuel consumption figure for the term of rental agreement;
(6) at the end of the rental agreement, recording total fuel supplied to the vehicle during the term of the agreement;
(7) comparing total fuel supplied to the vehicle with the expected volume of fuel supplied to a vehicle, to determine if adequate fuel has been supplied to the vehicle.

10. A method as claimed in claim 9, including, if the total fuel actually supplied to the vehicle during the term of the rental agreement is less than the expected amount of fuel that was consumed during the time of the rental agreement, charging the customer for the difference between these two amounts.

11. A method is claimed in claim 10, including in the rental agreement the following provisions:
(a) the volume of fuel that should be supplied to the vehicle is to be calculated from the distance traveled by the vehicle during the term of the rental agreement and a base fuel consumption rate figure;
(b) if the actual total fuel actually supplied to the vehicle during the term of the agreement is less than the expected volume of fuel that should have been supplied to the vehicle, charging the customer for the difference in the two amounts;
(c) providing that the charge will be calculated as the difference between the two amounts multiplied by a fixed price for the fuel per unit volume.

12. In combination a vehicle and a fuel measuring device mounted on an inlet to a vehicle fuel tank, the fuel measuring device comprising a sensor for measuring fuel supplied to the vehicle, a data store for storing the fuel data, and a connector or display for enabling transmission of the data to another device for use externally of the vehicle.

* * * * *